United States Patent
Tsuchihashi et al.

(10) Patent No.: US 9,671,918 B2
(45) Date of Patent: Jun. 6, 2017

(54) ELECTRONIC INDUCTION TYPE SENSOR PANEL AND METHOD FOR REDUCING INDICATION ERROR

(71) Applicant: LENOVO (Singapore) PTE, LTD., New Tech Park (SG)

(72) Inventors: Moriyuki Tsuchihashi, Sagamihara (JP); Koji Kawakita, Yokohama (JP); Yi Zheng, Yokohama (JP); Kazuo Fujii, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 59 days.

(21) Appl. No.: 14/515,110

(22) Filed: Oct. 15, 2014

(65) Prior Publication Data

US 2015/0102806 A1    Apr. 16, 2015

(30) Foreign Application Priority Data

Oct. 15, 2013   (JP) .................................. 2013-214375

(51) Int. Cl.
  *G06F 3/046*   (2006.01)
  *G06F 3/041*   (2006.01)
(52) U.S. Cl.
  CPC ............ *G06F 3/046* (2013.01); *G06F 3/0418* (2013.01)
(58) Field of Classification Search
  None
  See application file for complete search history.

(56) References Cited

U.S. PATENT DOCUMENTS

| | | | | | |
|---|---|---|---|---|---|
| 4,552,991 | A | * | 11/1985 | Hulls | G06F 3/046 178/20.04 |
| 4,948,926 | A | * | 8/1990 | Murakami | G06F 3/046 178/18.07 |
| 5,635,684 | A | * | 6/1997 | Fukuzaki | G06F 3/046 178/18.07 |
| 5,691,511 | A | * | 11/1997 | Matsushima | G06F 3/046 178/18.04 |

(Continued)

FOREIGN PATENT DOCUMENTS

| | | |
|---|---|---|
| JP | 63070326 | 3/1988 |
| JP | 03-201018 | 9/1991 |
| JP | 06-230881 | 8/1994 |

(Continued)

*Primary Examiner* — Amare Mengistu
*Assistant Examiner* — Sarvesh J Nadkarni
(74) *Attorney, Agent, or Firm* — Kunzler Law Group

(57) ABSTRACT

To reduce an indication error at a peripheral part of an electromagnetic induction type coordinate detection device, sensor coils having a coil width of 21 pitches are arranged at a central part at intervals of 4 pitches. At a peripheral part, the coil width is shortened from sensor coil #5 to coil #1 sequentially so that the coil width of a sensor coil is shorter than a coil width of an inwardly adjacent sensor coil by 2 pitches. This enables the coil side pitch that is 1 all over the coil group 222, and an area enabling three-point supplementing can be enlarged from the conventional one. The sensor coils at the peripheral part have a coil pitch of 3, and so an indication error there can be reduced compared with the conventional case of coil pitch of 4 for two-point supplementing as well. Dummy wires required at the peripheral part conventionally can be eliminated.

17 Claims, 9 Drawing Sheets

(56) References Cited

U.S. PATENT DOCUMENTS 8,300,030 B2 * 10/2012 Yeh .................. G06F 3/046
                                                178/18.01
2014/0084907 A1 * 3/2014 Kobori ............... G06F 3/046
                                                324/207.24

FOREIGN PATENT DOCUMENTS

| JP | 08-161100 | 6/1996 |
| JP | 2002-531902 | 9/2002 |
| JP | 2006309308 | 11/2006 |
| JP | 2012-098833 | 5/2012 |

* cited by examiner (A)

(B)

ELECTRONIC INDUCTION TYPE SENSOR PANEL AND METHOD FOR REDUCING INDICATION ERROR

FIELD

The disclosed embodiments relates to techniques to improve the accuracy of indication at a peripheral area of an electromagnetic induction type coordinate detection device that is configured to operate with an electronic pen.

BACKGROUND

Some portable electronic devices such as a tablet terminal, a smartphone, and a laptop PC are equipped with a coordinate detection device called a digitizer tablet (hereinafter called a digitizer) as an input device or are connected with external interfaces. A digitizer is configured to allow a user to input data using a position indicator (electronic pen). One of the operating principles of the digitizer is based on electromagnetic induction. Such an electromagnetic induction-type digitizer includes a coil array disposed at a sensor panel that detects the position of the electronic pen based on magnetic flux of electromagnetic waves propagating between the sensor panel and the electronic pen. Such a digitizer allows a system to recognize hand-written letters and figures drawn on the sensor panel with the electronic pen.

SUMMARY

At a sensor panel of a digitizer, a plurality of loop-like sensor coils are arranged so that their coil sides have a fixed coil pitch. When an electronic pen is placed at the center of a sensor coil, the sensor coil has maximum signal intensity. For detection of coordinates, the sensor coils are scanned entirely to extract three sensor coils including the sensor coil having the highest inductive voltage (signal intensity) and sensor coils on both sides thereof, and calculate the coordinates of a barycenter while setting the inductive voltage of the extracted sensor coils as weight. Such a method to detect the coordinates is called a three-point supplementing method.

When the sensor coils having the same shape are arranged next to each other, coil sides at an end part have a pitch wider than that of inner coil sides. Then, as the electronic pen approaches the end part from the coil center of the sensor coil that is the closest to the end part, then there is a part where no sensor coil having the coil center is present. At this time, the signal intensity is the largest at the outermost sensor coil, and is the second largest at the next sensor coil on the inner side.

For detection of the coordinates in this case, the barycenter is calculated while setting the signal intensities of the two sensor coils as weight. In principle, coordinates detected are brought inward from the actual position of the electronic pen, and to cancel such an error, certain correction is performed in accordance with the signal intensity. Such a method to detect coordinates is called a two-point supplementing method. In the area for two-point supplementing, the signal intensity becomes weaker and the S/N ratio becomes lower as the electronic pen moves outside, and so a difference between the position of the electronic pen and the coordinates detected (hereinafter called an indication error) increases.

Since a user knows the position of the electronic pen that is detected by the digitizer with a cursor displayed on the digitizer, the user can input data at their intended coordinates. However, they conventionally avoid using the peripheral area for specific operations such as graphic design, because a problem may occur due to the indication error. This means that the operation screen of the digitizer that a user can use effectively becomes narrower than the effective display area. During the operation other than graphic design as well, a user may feel difficulty in operation due to an indication error.

A sensor panel includes: a first sensor coil group including a plurality of sensor coils having a same coil width, the first sensor coil group being disposed at a central part of a coil array with a predetermined coil side pitch; and a second sensor coil group including a plurality of sensor coils having a coil width narrower than the coil width of the first sensor coil group, the second sensor coil group being disposed at a peripheral part of the coil array. This configuration can enlarge the area enabling three-point supplementing, and further can suppress an indication error by two-point supplementing because of the coils width shortened.

The second sensor coil group may define a coil side pitch equal to the predetermined coil side pitch of the first sensor coil group. In this case, magnetic flux radiated from a position indicator can be made uniform between the central part and the peripheral part of the coil array, and dummy wires are not required. The sensor coils making up the second sensor coil group may have coil widths that are shortened gradually from an inside to an outside of the coil array.

In a sensor coil making up the first sensor coil group, an outside coil side and an inside coil side of another sensor coil are alternately disposed, and in a coil width of a sensor coil on an outermost side making up the second sensor coil group, an outside coil side of another sensor coil only may be disposed. Let that the sensor coils have the number of turns n and the predetermined coil side pitch is 1, the sensor coils making up the second sensor group may have coil widths that are shortened from an inside to an outside of the coil array so that a coil width of a sensor coil is shorter than a coil width of an inwardly adjacent sensor coil by n pitch.

When the number of sets of coil sides of another sensor coil to be inserted in a coil width of a sensor coil making up the first sensor coil group is m, a coil width may be shortened from a sensor coil located at the m/2th from the outside of the coil array. The sensor coils making up the second sensor coil group may have a coil pitch smaller than a coil pitch of the sensor coils making up the first sensor coil group by n/2 pitch. When the number of turns of each sensor coil is 2 or more, a set of coil sides of each sensor coil may have a coil side pitch equal to the predetermined coil side pitch. A sensor panel according to the disclosed embodiments is applicable to a coordinate detection device or to electronic equipment.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Tablet Terminal

Figure 1:
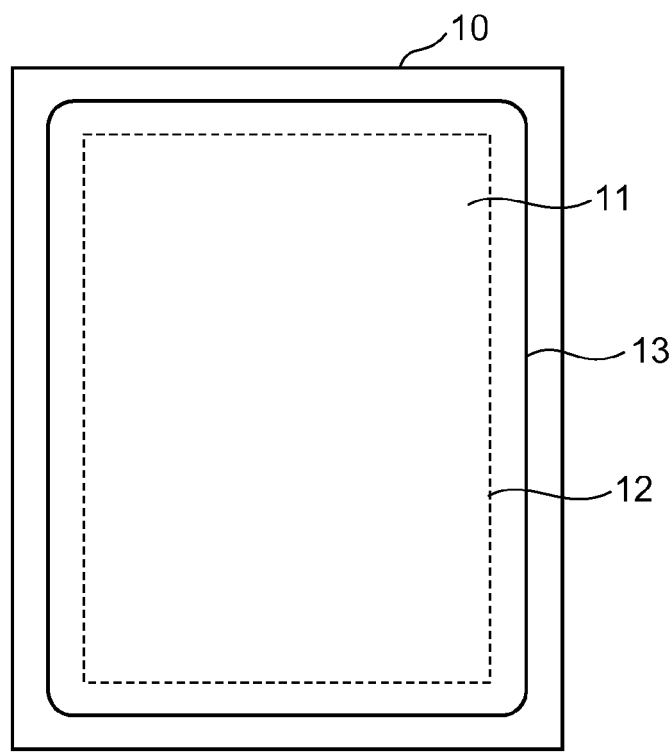
FIG. 1 illustrates the shape of a tablet terminal 10 that is one example of a portable electronic device including a sensor panel.
Figure 2:
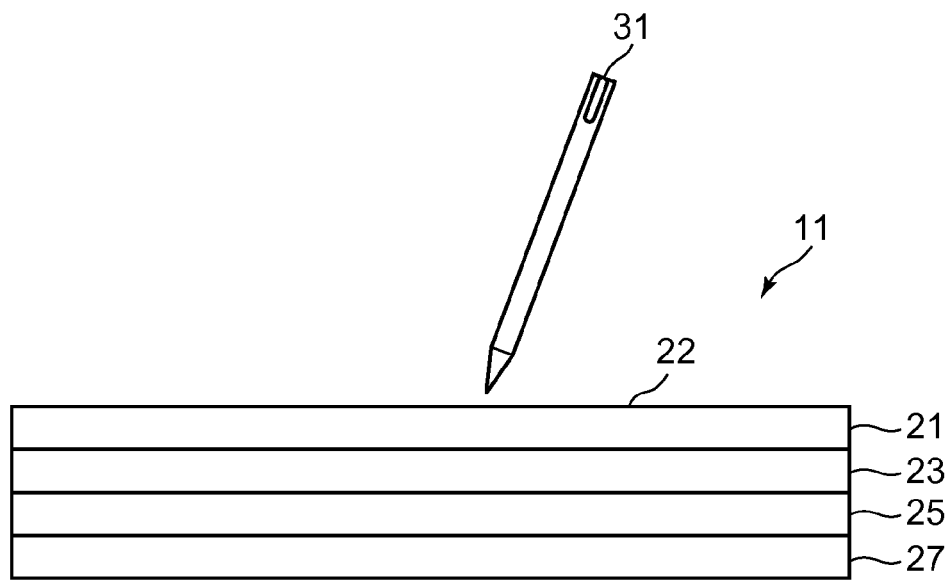
FIG. 2 is a cross-sectional view to describe the configuration of a display system 11.

FIG. 1 is a plan view illustrating the shape of a tablet terminal 10 that is one example of a portable electronic device including a digitizer. The tablet terminal 10 is provided with a display assembly 11 including a sensor panel 25 (FIG. 2). The display assembly 11 has a display area that defines a graphic area 12. The graphic area 12 is located at a central part of the display surface of the display assembly 11 other than areas close to a rectangular case edge 13 as an area with less indication error of an electronic pen 31 (FIG. 2) on the sensor panel 25.

FIG. 2 is a cross-sectional view to describe the configuration of the display assembly 11. Like reference numerals designate like parts throughout the figures of the present specification. The display assembly 11 includes a touch panel 21, a LCD 23, the sensor panel 25 and a shield panel 27 laminated in this stated order from the above. The surface of the display assembly 11 makes up an operation screen 22 of the touch panel 21 and the sensor panel 25.

The display assembly 11 is configured so that the touch panel 21 generates coordinates data in response to detection of a finger approaching the operation screen 22, or so that the sensor panel 25 detects the electronic pen 31 approaching to generate coordinates data and detects the pressure of the electronic pen 31 to generate pen-pressure data. The disclosed embodiments is applicable to a separate-type digitizer as well that is connected to an electronic device via an external interface. The touch panel 21 is not an element essential to the disclosed embodiments.

Figure 3:
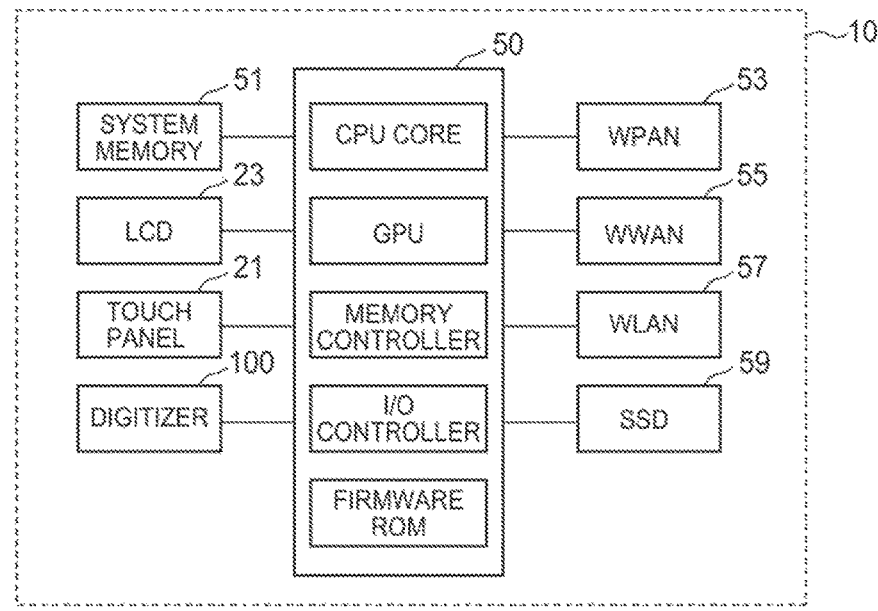
FIG. 3 is a functional block diagram to describe one example of the configuration of the tablet terminal 10.

FIG. 3 is a functional block diagram to describe one example of the configuration of the tablet terminal 10. The tablet terminal 10 includes a system memory 51, a LCD 23, a touch panel 21, a digitizer 100, a WPAN (Wireless Personal Area Network) module 53, a WWAN (Wireless Wide Area Network) module 55, a WLAN (Wireless Local Area Network) module 57 and a SSD 59, for example, which are connected to a SOC (System on a chip) type embedded system 50. The digitizer 100 includes a sensor panel 25.

The embedded system 50 includes a CPU core, a GPU, a memory controller, an I/O controller and a firmware ROM and the like. The SSD 59 stores software such as an application program, an operating system and a device driver that the CPU core executes. The hardware and the software of the tablet terminal 10 have a well-known structure.

Figure 4:
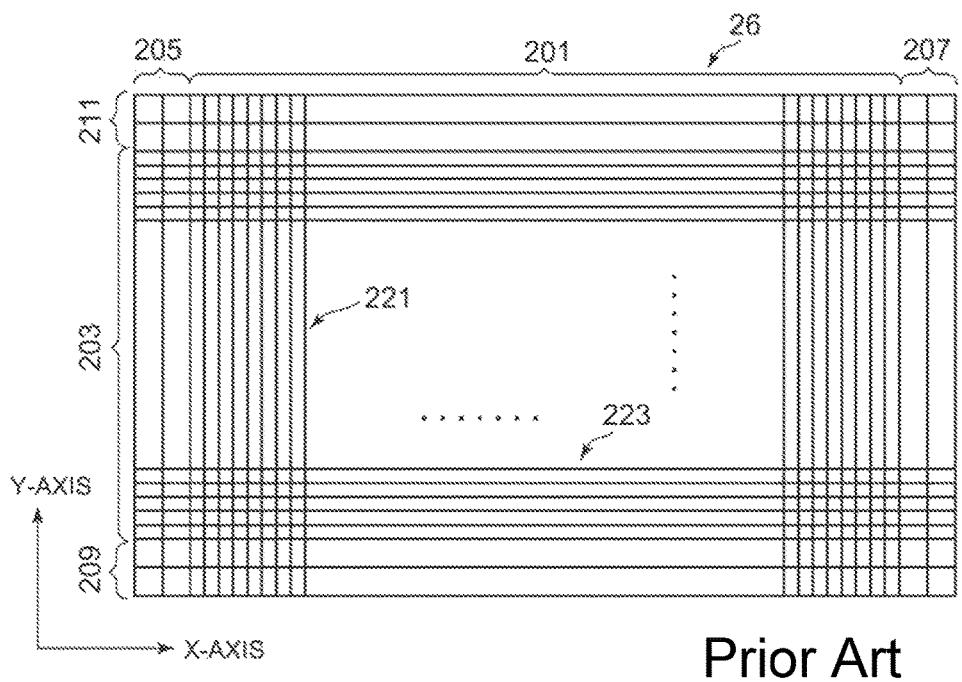
FIG. 4 describes an exemplary configuration of a conventional coil array 26.
Figure 5:
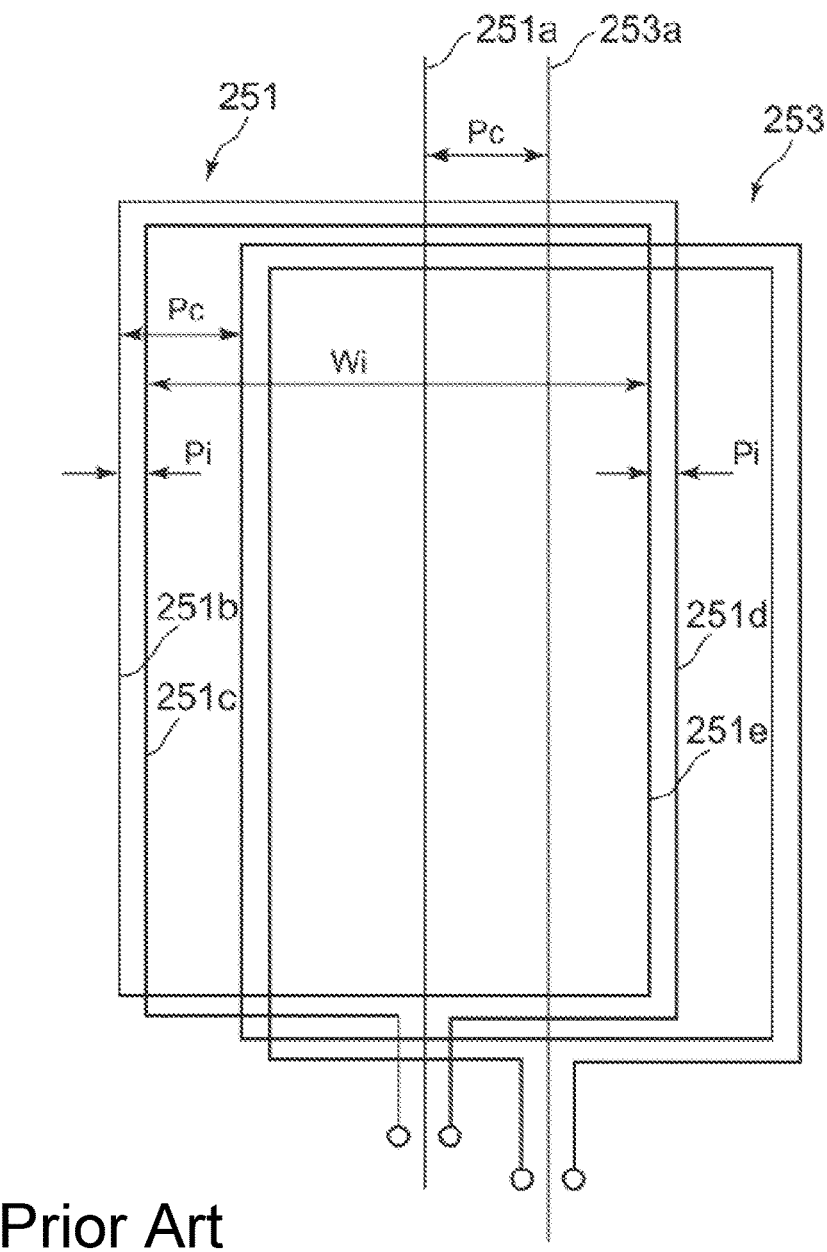
FIG. 5 describes the shapes and parameters of sensor coils.
Figure 6:
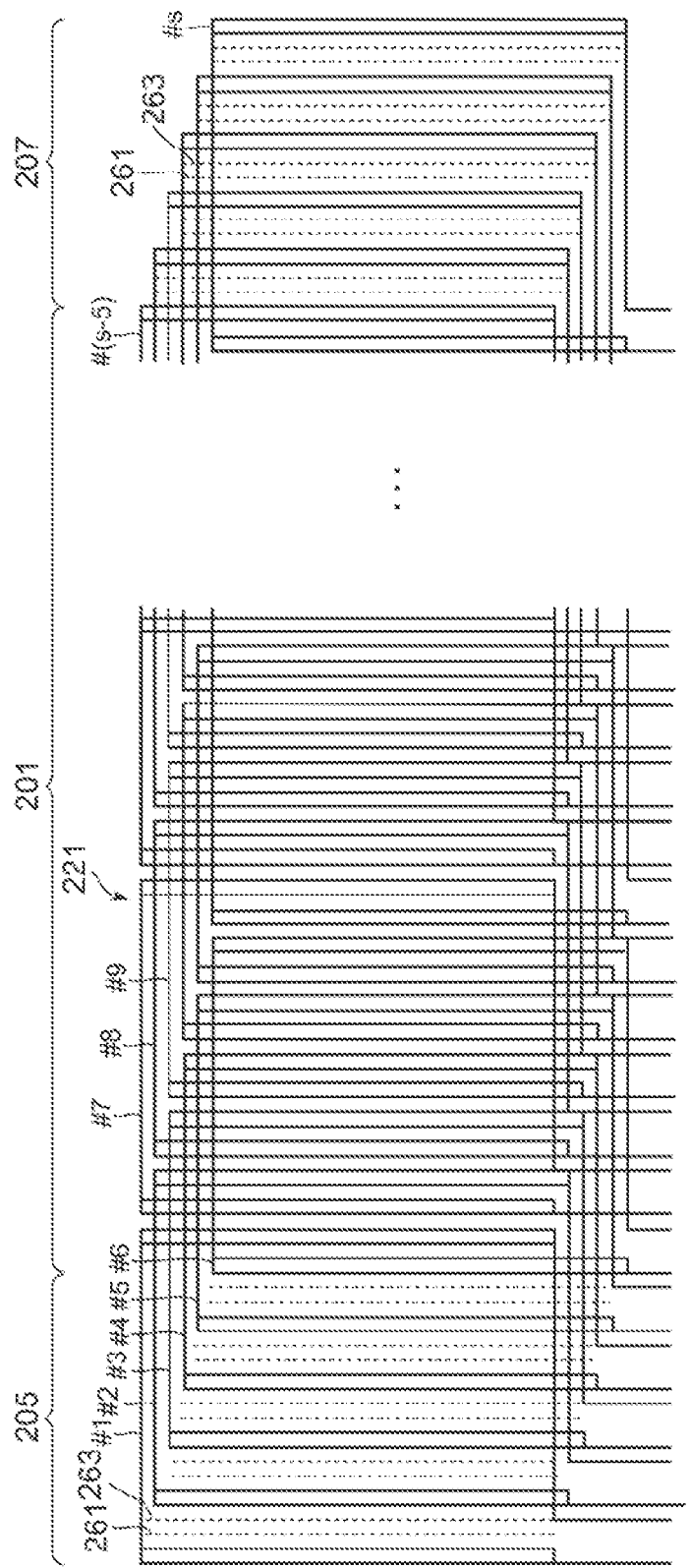
FIG. 6 describes how to arrange a conventional coil group 221.

FIG. 4 describes a conventional coil array 26 disposed at the sensor panel 25. FIG. 5 describes the shapes and parameters of two sensor coils 251 and 253 making up a coil group 221 illustrated in FIG. 4. FIG. 6 describes how to arrange the sensor coils of the coil group 221. As illustrated in FIG. 4, the coil array 26 includes the coil group 221 in the X-axis direction and a coil group 223 in the Y-axis direction to detect coordinates based on electromagnetic wave interference with the electronic pen 31. The coil array 26 includes central areas 201 and 203 at a central part in the X-axis direction and in the Y-axis direction and peripheral areas 205 to 211 at both ends of the central areas 201 and 203 defined therein, the purpose of which is described later in details.

The coil groups 221 and 223 are made up of a plurality of loop-like sensor coils. The conventional coil groups 221 and 223 include loop-like sensor coils 251 and 253 illustrated in FIG. 5 that are regularly arranged in the X-axis direction and in the Y-axis direction. The coil array 26 may be configured by pattern formation of the coil group 221 on the surface and the coil group 223 on the rear face of a PCB (print circuit board), or by pattern formation of the coil group 221 and the coil group 223 on different PCBs, followed by lamination thereof.

The number of turns n of each sensor coil is not limited especially, and the following exemplifies the case of the number of turns n of 2. As illustrated in FIG. 5, two adjacent sensor coils 251 and 253 making up a part of the coil group 221 have a rectangular shape, where coil axes 251a and 253a, respectively, are defined in their longitudinal directions. The sensor coil 253 is disposed adjacent to the sensor coil 251 in the X-axis direction. The following refers to the direction of the sensor coils so that a side closer to the outermost part of the coil array 26 is outside, and a side close to the center is inside.

Parts of the sensor coil 251 parallel to the coil axis 251a are called coil sides 251b to 251e. The coil sides of each sensor coil making up the coil group 221 are arranged perpendicularly to the X axis, and the coil sides of each sensor coil making up the coil group 223 are arranged perpendicularly to the Y axis. A set of the two coil sides 251b and 251c making up one side of the coil axis 251a and a set of the two coil sides 251d and 251e making up the other side are hereinafter called a set of the coil sides. When the coil axis 251a is located on the left of the center in the X-axis direction of the coil array 26, the set of coil sides 251b and 251c is located outside, and the set of coil sides 251d and 251e is located inside. When the coil axis 251a is located on the right of the center, the set of coil sides 251d and 251e is located outside, and the set of coil sides 251b and 251c is located inside.

The coil sides 251b and 251c and the coil sides 251d and 251e making up these sets of coil sides have the same interval, which is called a coil side pitch Pi. The term coil side pitch Pi is used for the interval with a coil side of an adjacent another sensor coil. The coil side pitch Pi corresponds to a coil side pitch of a set of coil sides or different coil sides at the central area 201, which corresponds to the minimum coil side pitch of the entire coil array 26. The interval between each sensor coil and an adjacent coil thereof is called a coil pitch Pc, and the interval between the two coil sides 251c and 251e that are close to the coil axis 251a of the sets of coil sides is called a coil width Wi.

Both of the coil pitch Pc and the coil width Wi are specified with the number of pitches of the coil pitch Pi. Each sensor coil of the coil group 221 and each sensor coil of the coil group 223 have different lengths in the coil axis direction, but they have the same number of turns n, the coil width Wi and the coil side pitch Pi of the set of coil sides. The following describes the coil group 221 while setting the coil side pitch Pi at 1, and the coil group 223 can be understood similarly.

In FIG. 6, the coil group 221 includes sensor coils with the number of turns n of 2 arranged to have the coil width Wi that is 21 pitches and the coil pitch Pc that is 4 pitches. The coil group 221 includes s pieces of sensor coils from #1 to #s that are arranged sequentially. The coil side on the outside of the set of coil sides on the outside (left) of the sensor coil #1 and the coil side on the outside of the set of coils on the outside (right) of the sensor coil #s define the outermost shape of the coil array 26.

The coil width Wi is set so that, when the sensor coils are arranged sequentially, between coil sides as a set in a certain sensor coil, a set of coil sides on one side of another sensor coil is inserted. For instance, in FIG. 6, between the coil sides as a set in the sensor coil #6, an inside set of coil sides of #1, an outside set of coil sides of #7, and an inside set of coil sides of #2, for example, are inserted so that inside sets of coil sides and outside sets of coil sides of other ten sensor coils #1 to #5 and #7 to #11 are alternately inserted. As a result, the coil sides are arranged with 1 pitch on the inside of the outside (left-side) set of coil sides of the sensor coil #6.

On the other hand, at an area on the outside of the outside set of coil sides of the sensor coil #6, there is no sensor coil whose inside set of coil sides is inserted therein, meaning that the sets of coil sides are arranged at the intervals of 3 pitches. As a result, the coil sides are arranged alternately with 1 pitch and 3 pitches. Similarly, at an area on the inside of the outside (right-side) set of coil sides of the sensor coil #(s−5), the coil sides are arranged with 1 pitch, and on the outside thereof, the coil sides are arranged alternately with 1 pitch and 3 pitches.

Magnetic flux of electromagnetic waves radiated from the electronic pen 31 is influenced by the density of coil sides formed at the PCB. That is, it is desirable that the coil side pitch be uniform all over the coil array 26 and so the distribution of magnetic flux passing therethrough do not change with the position of the electronic pen 31. Meanwhile eddy current occurs at the shield panel 27 due to magnetic field generated from the current flowing through the sensor coils. Such eddy current influences the signal intensity of the sensor coils. To reduce such influence, two dummy wires 261 and 263 are conventionally provided with 1 pitch, which are indicated with dot lines in a section having the coil side pitch of 3 near the outermost part of the coil array 26.

As illustrated in FIGS. 4 and 6, the coil array 26 includes the central area 201 and the peripheral areas 205 and 207 in the X-axis direction, and the central area 203 and the peripheral areas 209 and 211 in the Y-axis direction. As described later, the digitizer 100 of the present embodiment detects coordinates by the three-point supplementing having high precision and the two-point supplementing having low precision. The central areas 201 and 203 correspond to the area where the three-point supplementing is possible because the coil sides are arranged uniformly with the coil side pitch Pi in a plan view of the coil array 26.

At an area surrounded with the central area 201 and the central area 203, an operation such as graphic design requiring high indication precision is possible, which corresponds to the graphic area 12 of FIG. 1 in the present embodiment. When the disclosed embodiments is applied, agreement between the graphic area 12 and the area surrounded with the central area 201 and the central area 203 is not necessarily required. At the central areas 201 and 203, dummy wires are not required because the coil sides are arranged uniformly with the minimum coil side pitch Pi.

At the peripheral areas 205 to 211, the coil sides are not arranged with a uniform pitch, and they are arranged at some parts with a pitch wider than the minimum coil side pitch Pi, and so these areas require the dummy wires 261 and 263. When the electronic pen 31 is positioned at the central area 201, the three-point supplementing is possible. When the electronic pen 31 is placed at a position closer to the central area 201 at the peripheral areas 205 and 207, the three-point supplementing may be possible. However, when the electronic pen is moved from there to a position closer to the outermost part of the coil array 26, the three-point supplementing cannot be performed, and instead the two-point supplementing is performed.

Figure 7:
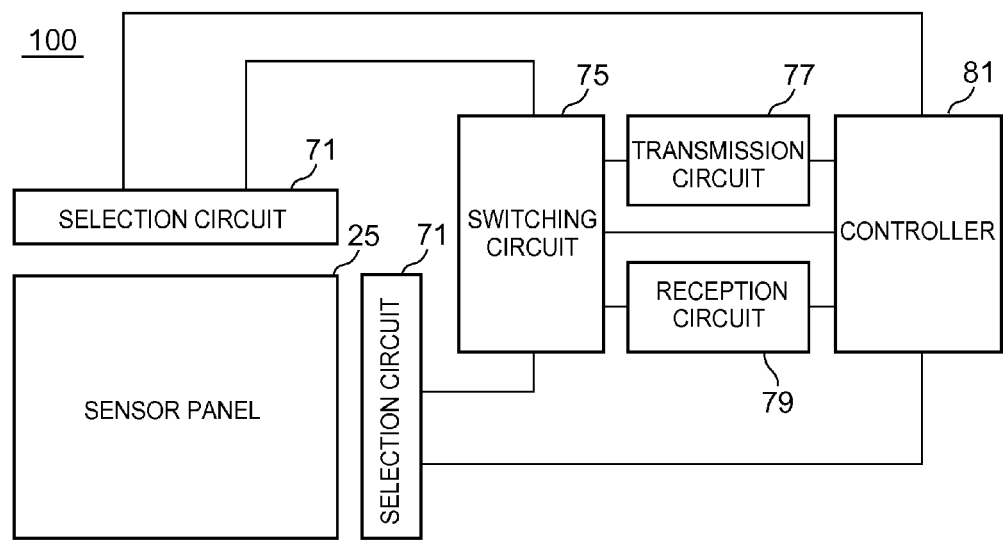
FIG. 7 is a functional block diagram to briefly describe the configuration of a digitizer 100.
Figure 8:
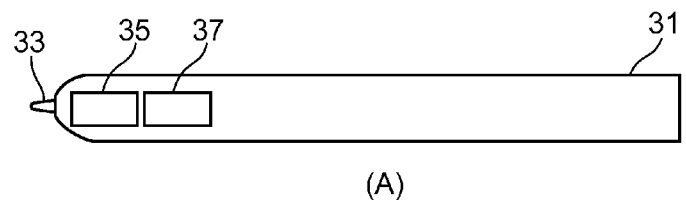
FIG. 8 describes an exemplary configuration of an electronic pen 31.
Figure 8:
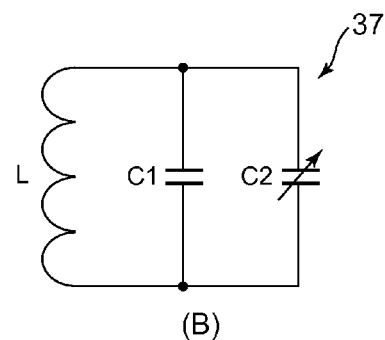

FIG. 7 is a functional block diagram to briefly describe the configuration of the electromagnetic induction type digitizer 100. FIG. 8 describes an exemplary configuration of the electronic pen 31. FIG. 8(A) briefly describes the electronic pen 31, and FIG. 8(B) is a circuit diagram of a resonance circuit 37. The electronic pen 31 includes a pen tip 33 at its tip end to indicate coordinates of the sensor panel 25. The electronic pen 31 internally accommodates a pressure transmission mechanism 35 and the resonance circuit 37.

The resonance circuit 37 is a parallel resonance circuit including a coil L, a capacitor C1 and a variable capacitor C2. When the coil L receives electromagnetic waves radiated from each sensor coil of the sensor panel 25, resonance current flows through the resonance circuit 37. The resonance current serves as an energy source, so that the coil L radiates electromagnetic waves. When pressure is applied to the electronic pen 31 while indicating at the operation screen 22 with the electronic pen, the pen tip 33 retracts internally to transmit the pressure to the pressure transmission mechanism 35.

The pressure at the pen tip 33 gives the feeling of pen pressure to the user as if they draw on paper with the pen. The pressure transmission mechanism 35 changes the electrostatic capacity of the variable capacitor C2 in accordance with the pressure. When the electrostatic capacity of the variable capacitor C2 changes, the resonance frequency changes, and so the frequency of electromagnetic waves radiated from the coil L also changes. The resonance circuit 37 may include a variable reactor that changes in reactance with the pressure, instead of the variable capacitor C2. Magnetic flux radiated from the electronic pen 31 induces inductive voltage (signal intensity) at a sensor coil in the vicinity of the electronic pen 31. The digitizer 100 detects the coordinates of the electronic pen 31 in the X-axis direction and the Y-axis direction from the coordinates of the sensor coil and the signal intensity.

The operation of the electronic pen 31 includes an up operation, a down operation and a pen-pressure operation. The up operation is an operation to place the electronic pen 31 at a position that the sensor panel 25 cannot detect the input, the down operation is an operation to place the electronic pen at a position that the sensor panel can detect the input, and the pen-pressure operation is an operation to press the pen tip 33 of the electronic pen 31 against the operation screen 22 of the touch panel 21. When the pen-pressure operation is performed, the electrostatic capacity of the variable capacitor C2 changes and so the resonance frequency also drifts slightly.

The digitizer 100 detects a difference between the frequency of electromagnetic waves transmitted in a transmission mode and the frequency of electromagnetic waves received in a reception mode, thus detecting a variation of the electrostatic capacity of the variable capacitor C2, i.e., the pressure applied to the pen tip 33. A selection circuit 71 selects the sensor coils of the coil groups 221 and 223 one by one sequentially based on a selection signal received from a controller 81, and forms a loop circuit via a transmission circuit 77 or a reception circuit 79 through a switching circuit 75.

While a predetermined sensor coil is selected based on a selection signal, the switching circuit 75 switches the loop circuit between the transmission circuit 77 and the reception circuit 79 at predetermined time intervals alternately a plurality of times based on a switching signal received from the controller 81. The operation when the transmission circuit 77 is selected based on the switching signal is called a transmission mode (transmission duration) and the operation when the reception circuit 79 is selected is called a reception mode (reception duration).

The controller 81 generates a switching signal so as to provide a plurality of transmission durations and reception durations during the selection of one sensor coil. The transmission circuit 77 supplies excitation current at a high frequency to the selected sensor coil during the transmission durations. When the excitation current flows through the sensor coil, the sensor coil radiates electromagnetic waves. When the down operation or the pen-pressure operation of the electronic pen 31 is performed, the coil L of the electronic pen resonances with the electromagnetic waves, and resonance current flows through the resonance circuit 37.

Magnetic flux radiated from the coil L of the electronic pen 31 due to the resonance current flowing through the resonance circuit 37 is received by the same sensor coil during the reception duration following the transmission duration. The reception circuit 79 converts the inductive voltage of the sensor coil detected during the reception duration into digital data, and sends the same to the controller 81. Since the inductive voltage of the sensor coil increases with increasing proximity of the electronic pen 31 to the coil axis, the controller 81 detects the inductive voltage of each sensor coil that is selected sequentially when the electronic pen 31 is located at predetermined coordinates, thereby specifying a plurality of sensor coils in the vicinity of the electronic pen 31 and creating coordinates data. The controller 81 performs this operation by the three-point supplementing method or the two-point supplementing method described later.

The controller 81 generates a switching signal and a selection signal, and creates coordinates data based on the inductive voltage of the sensor coils. When the electronic pen 31 is pressed against the operation screen 22 during the pen-pressure operation, the electrostatic capacity of the variable capacitor of the electronic pen 31 changes, and so the frequency of the resonance current flowing through the resonance circuit changes. The controller 81 calculates a difference between the frequency of excitation current transmitted during transmission durations and the frequency of inductive voltage detected during reception durations, and creates pen-pressure data. The controller 81 then sends out the coordinates data and the pen-pressure data to the embedded system 50.

Figure 9:
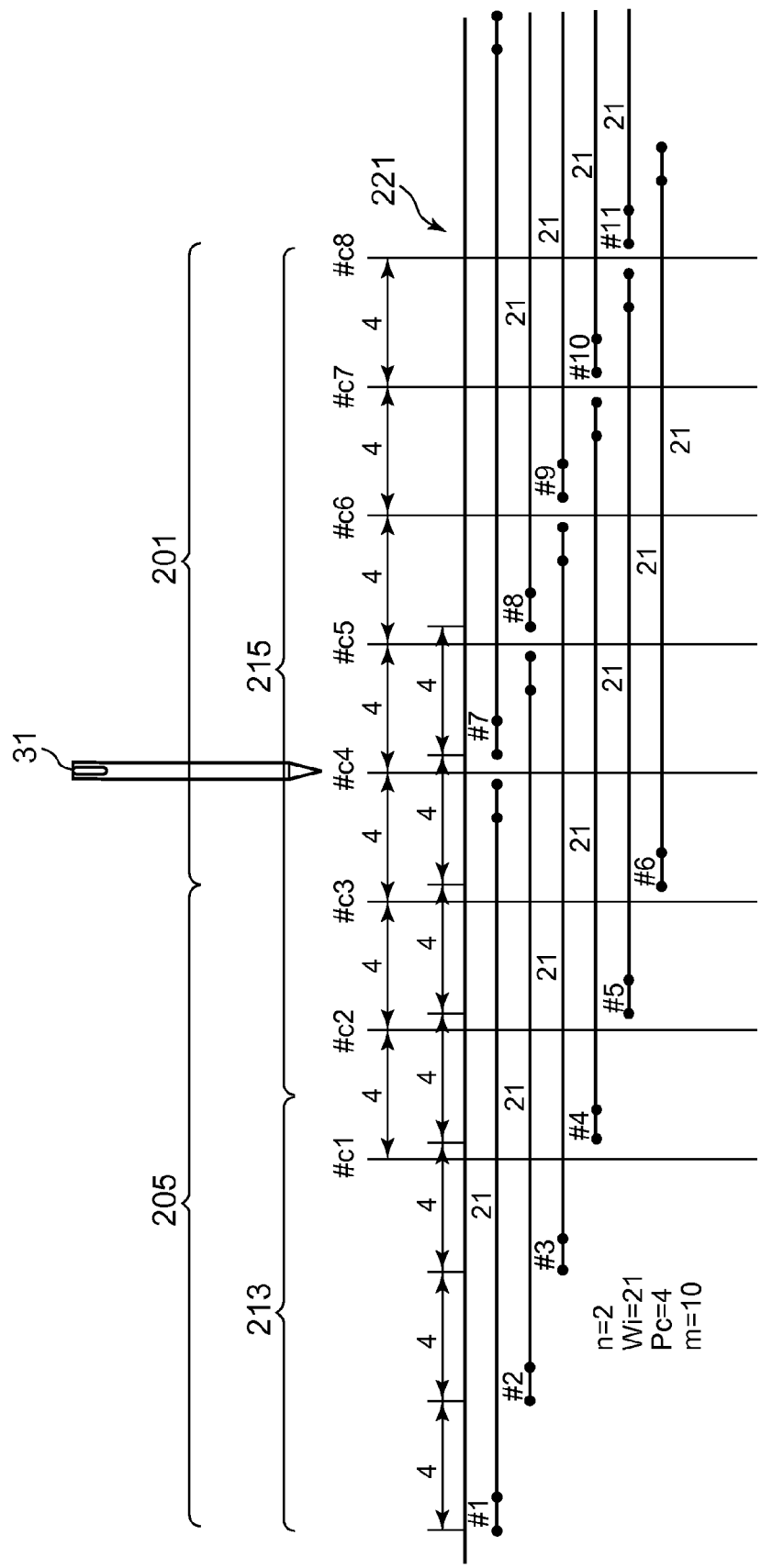
FIG. 9 schematically illustrates the cross-section of the conventional coil group 221 of FIG. 6.
Figure 10:
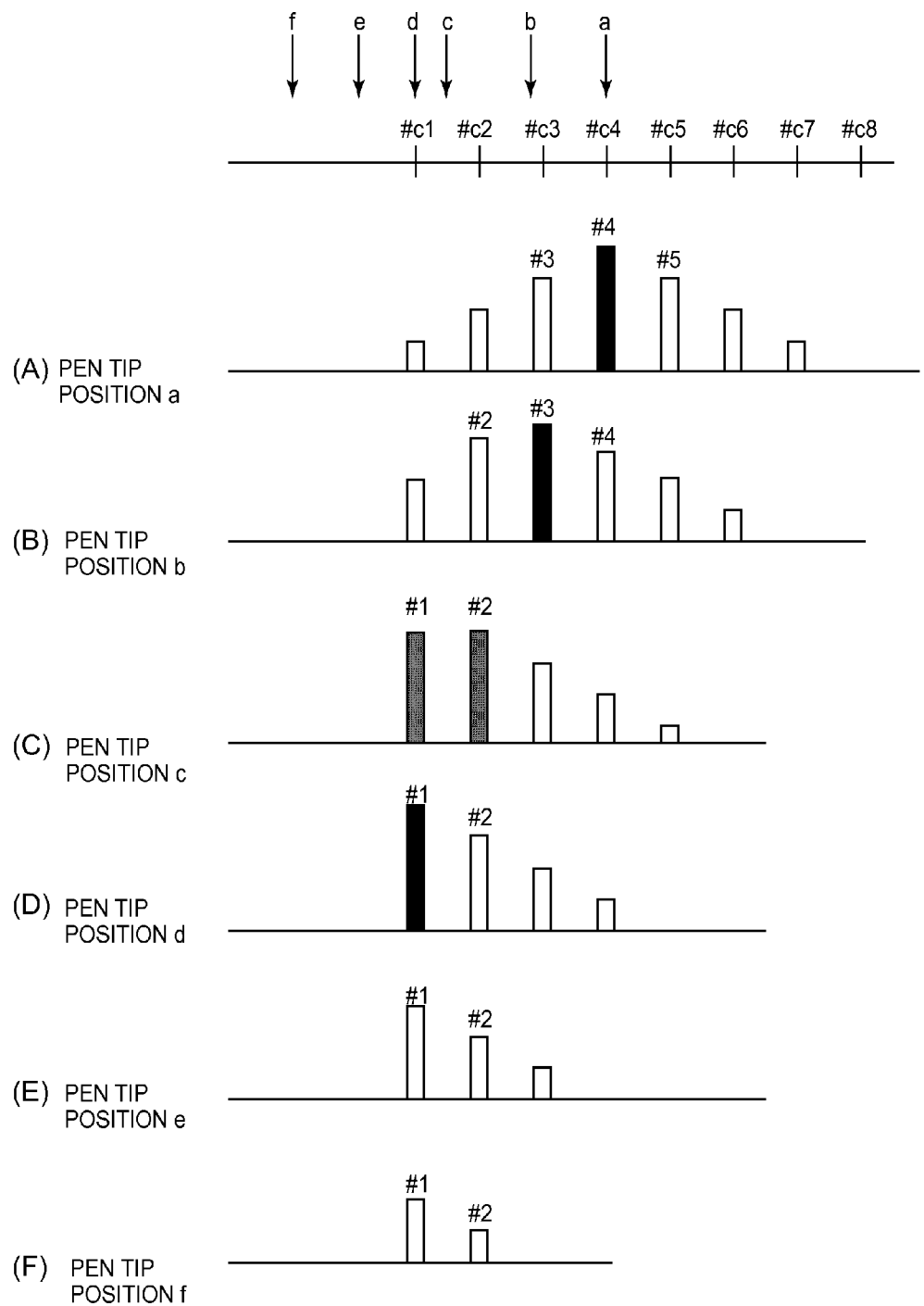
FIG. 10 describes the state where a controller 81 detects coordinates by a three-point supplementing method and a two-point supplementing method.

FIG. 9 schematically illustrates the cross-section of the conventional coil group 221 of FIG. 6. Sensor coils arranged in the vicinity of the sensor coil #s and sensor coils arranged in the vicinity of the outermost part of the coil array 26 of the coil group 223 can be understood similarly. FIG. 10 describes the state where the controller 81 detects coordinates by the three-point supplementing method and the two-point supplementing method when the electronic pen 31 of FIG. 9 moves from the coil axis #c4 of the sensor coil #4 to the outside. The controller 81 extracts the sensor coil having the largest signal intensity and the sensor coils located on both sides thereof from the sensor coils making up the coil group 221.

A sensor coil has signal intensity that is the largest when the electronic pen 31 is positioned at the coil axis. At this time, sensor coils arranged on both sides thereof with the same pitch have the second largest signal intensity. Let that sets of the signal intensity and the coordinates of the sensor coils having up to the third largest signal intensity are represented as (g1,x1), (g2,x2) and (g3,x3), the coordinates of the electronic pen 31 in the X direction is as in the following Expression (1):

$$x=(g1*x1+g2*x2+g3*x3)/(g1+g2+g3) \quad (1)$$

In Expression (1), the barycenter of a plurality of coordinates is calculated while setting the signal intensity as weight. Calculation of the coordinates of the electronic pen 31 based on Expression (1) is called the three-point supplementing. FIG. 10(A) illustrates the state where the electronic pen 31 is located at position a of the coil axis #c4, meaning that the signal intensity is the largest at the sensor coil #4 and is the second largest at the sensor coils #3 and #5 both having the same value. FIG. 10(B) illustrates the state where the electronic pen 31 is located at position b between the coil axes #c3 and #c2, and is closer to #c3, meaning that the signal intensity is the largest at the sensor coil #3, the second largest at the sensor coil #2 and the third largest at the sensor coil #4. Since there are sensor coils having the second and the third largest signal intensities on both sides of the sensor coil having the largest signal intensity in FIGS. 10(A) and (B), the controller 81 can detect the coordinates by the three-point supplementing.

FIG. 10(C) illustrates the state where the electronic pen 31 is located at position c that is the middle of coil axes #c2 and #c1. The point c corresponds to the theoretical limit where the three-point supplementing is possible. When the electronic pen 31 is located outside of the position c, the controller 81 performs the two-point supplementing, and when the electronic pen is located inside thereof, the controller performs the three-point supplementing. On the right end of the coil array 26 as well, such shifting from the three-point supplementing to the two-point supplementing is performed at a similar position as the electronic pen 31 approaches the sensor coil #s.

In the state of FIG. 10(C), the two sensor coils have the same and the largest signal intensity, and this is not the case where sensor coils on both sides of one sensor coil having the largest signal intensity have the second largest signal intensity. When three adjacent sensor coils having their signal intensities changing like a mountain shape are not detected, the controller 81 switches from the three-point supplementing to the two-point supplementing, thus calculating the barycenter of the top two sensor coils based on Expression (1), and then correcting the coordinates with the absolute values of the signal intensity of the sensor coils #1 and #2.

FIG. 10(D) illustrates the state where the electronic pen 31 is located at position d of the coil axis #c1, where the signal intensity is the largest at the sensor coil #1, and is the second largest at the inside sensor coil #2. FIGS. 10(E) and (F) illustrate the state where as the electronic pen 31 moves to position e and position f located outside, the signal intensities of the sensor coil #1 and the sensor coil #2 decrease gradually.

For the two-point supplementing in the states of FIGS. 10(C) to (F), the controller 81 has to correct the coordinates of the barycenter with the signal intensities of the sensor coils #1 and #2. At this time, since the S/N ratio decreases with decreasing the signal intensity, the accuracy deteriorates compared with the three-point supplementing. As a result of this, as illustrated in FIG. 9, a two-point supplementing area 213 can be defined at the peripheral area 205 from the point c between the coil axes #c1 and #c2 to the outside set of coil sides of the sensor coil #1 defining the outermost part of the coil array 26, and next to the two-point supplementing area 213, a three-point supplementing area 215 can be defined internally.

In this way, the insertion position of the dummy wires 261 and 263, the two-point supplementing area 213, the three-point supplementing area 215, the peripheral area 205 and the central area 201 have the following relationship. That is, the central area 201 is an area that does not include the dummy wires 261 and 263, and where the three-point supplementing is possible. The peripheral area 205 is an area that includes the dummy wires 261 and 263, and is made up of a part of the three-point supplementing area 215 located inside and the two-point supplementing area 213 located outside. An indication error is the smallest at the central area 201, is the second smallest at the three-point supplementing area 215 included in the peripheral area 205, and is the largest at the two-point supplementing area 213. In the present specification, the three-point supplementing is just an example of detecting signals of three or more sensor coils, and includes the case of using four or more sensor coils as well.

Figure 11:
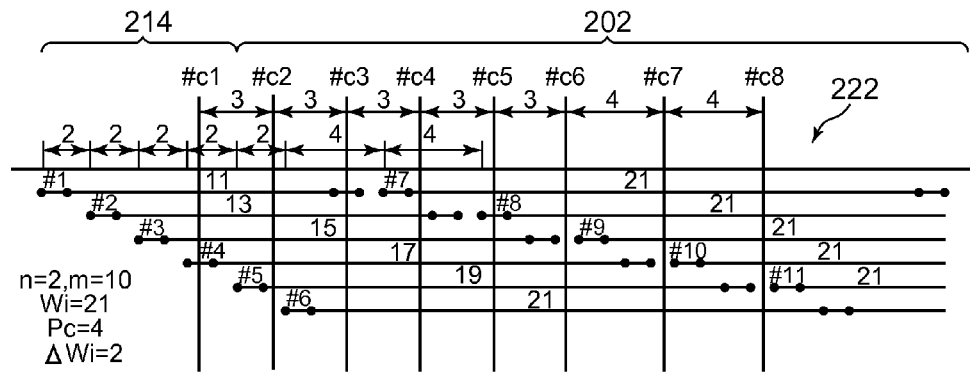
FIG. 11 describes a sensor panel according to the present embodiment, capable of shortening the coil width at a peripheral part and so reducing an indication error.

FIG. 11 describes a coil array according to the present embodiment that shortens the coil width Wi at the peripheral part and so can reduce an indication error. FIG. 11 corresponds to FIG. 9, and so a coil group 222 is configured similarly to the coil group 221 of FIG. 9 at a central area 202 with the number of turns n of 2, having the coil width Wi that is 21 pitches, the coil side pitch Pi is 1 pitch and the coil pitch Pc that is 4 pitches. The coil group 222 includes sensor coils #5 to #1 having the coil widths Wi that becomes narrower gradually toward the outside by shorting width ΔWi that is 2 pitches. For the sensor coils #5 to #1, the coil width Wi#(r) of a sensor coil having the coil number #r is calculated by Expression (2):

$$Wi\#(r) = Wi\#(r+1) - \Delta Wi \qquad (2)$$

In order to arrange the sensor coils #1 to #5 so that the coil side pitch defined between the inside set of coil sides and the set of coil sides of other sensor coils becomes uniform, the position of the outside set of coil sides is shifted gradually to the inside. The sensor coils #5 to #1 have the coil width Wi of Wi#(5)=Wi#(6)−2=19, Wi#(4)=17, Wi#(3)=15, Wi#(2)=13, Wi#(1)=11, so that the sensor coils on the outside of the sensor coil #6 have the coil pitch Pc of 3.

In a plan view of the coil group 222, outside sets of coil sides of the sensor coils #2 to #6 are inserted into the coil width of the sensor coil #1, so that the outside sets of coil sides of the sensor coils #6 to #1 are arranged with the coil side pitch of 1. Unlike the coil group 221 of FIG. 9, the coil group 222 does not include an area corresponding to the peripheral area 205 at the peripheral parts, and includes a two-point supplementing area 214 only. Such a coil configuration has various advantageous effects. Firstly, since the coil sides are arranged uniformly with the minimum coil side pitch at the two-point supplementing area 214, the dummy wires 261 and 263 as in the conventional coil group 221 are not required. Secondly, since the transmission condition of magnetic flux radiated from the electronic pen 31 at the central area 202 and the two-point supplementing area 214 becomes uniform compared with the configuration including the dummy wires, an indication error can be suppressed.

Whereas the coil group 221 of FIG. 9 has the width of the two-point supplementing area 213 that is 13.5 pitches, the coil group 222 of FIG. 11 has the width of the two-point supplementing area 214 that is 8 pitches, which is smaller by 5.5 pitches. Since the central area 202 enabling the three-point supplementing can be enlarged more on both sides of the coil array by 5.5 pitches than the central area 201 enabling the three-point supplementing, the area of the graphic area 12 of FIG. 1 can be enlarged. Further, the coil pitch Pc is 3 on the outside of the coil axis #c6, an indication error can be reduced compared with the coil group 221 for both of the three-point supplementing and the two-point supplementing.

Figure 12:
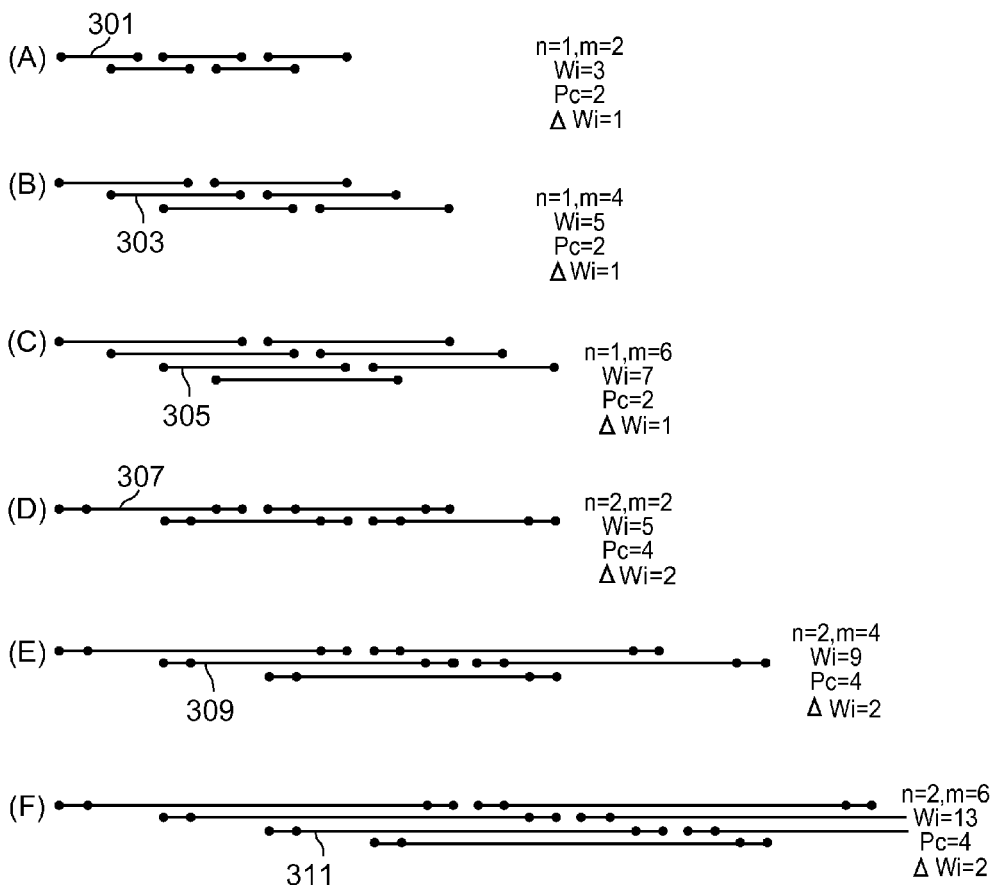
FIG. 12 describes an exemplary configuration of a coil array, to which the disclosed embodiments are applicable.

Although FIG. 11 describes the method to make the coil side pitch uniform based on an example having a specific configuration, the disclosed embodiments can have various values as the number of turns n, the coil width Wi, the coil pitch Pc, and the shortening width ΔWi. FIG. 12 describes one example of the configuration of the coil array, to which the disclosed embodiments is applicable. The disclosed embodiments assumes that all sensor coils have the same number of turns n and the coil side pitch Pi is uniform all over the two-point supplementing area 214 and the central area 202. When n is 2 or more, the coil side pitch Pi of a set of coil sides is a coil side pitch of the coil array as a whole.

Herein, the coil array may be configured so that a sensor coil having an outside set of coil sides located at the peripheral area 205 of FIG. 9 has a coil width Wi that is narrower than the coil width of a sensor coils having coil sides located at the central area 201, thus decreasing the number of dummy wires or enlarging the area enabling three-point supplementing, and such a configuration of the coil array also is included in the scope of the disclosed embodiments as long as similar effects to those from the coil group 222 can be obtained therefrom. Firstly, after determining the number of turns n at a predetermined design condition, the coil pitch Pc is set at Pc=2×n pitches.

The coil pitch Pc larger than 2n is not preferable because the coil side pitch becomes not uniform at the central area or becomes larger than 1 pitch. Next, let that the number of sets of coil sides inserted into the coil width Wi of one sensor coil at the central area 202 is m, the relationship between the coil width Wi and the number of the sets of the coil sides m is calculated by Expression (3):

$$Wi = m \times n + 1 \qquad (3)$$

Referring to FIG. 12(G), the state of this is described below. In a plan view of the coil array, the sets of coil sides in number m of 8, each made up of two coil sides are inserted in the coil width Wi of 17 pitches between the sets of coil sides on both sides of a sensor coil 317. Next, a coil width Wi such that the coil sides are not overlapped in a plan view is selected from the coil widths Wi satisfying Expression (3). FIG. 12(A) to (H) illustrate a part of the thus selected patterns of the number of turns n, the coil width Wi, the number m of the sets of coils sides to be inserted.

The coil width Wi calculated by Expression (3) is applied to a sensor coil arranged at a central part of the coil array, whose coil width is not shortened. Then coil widths of sensor coils arranged sequentially from #1 to #q at a position close to the outermost part of the coil array are calculated by Expression (2), where ΔWi denotes the shorting width. Herein ΔWi is n pitch.

Figure 12B:
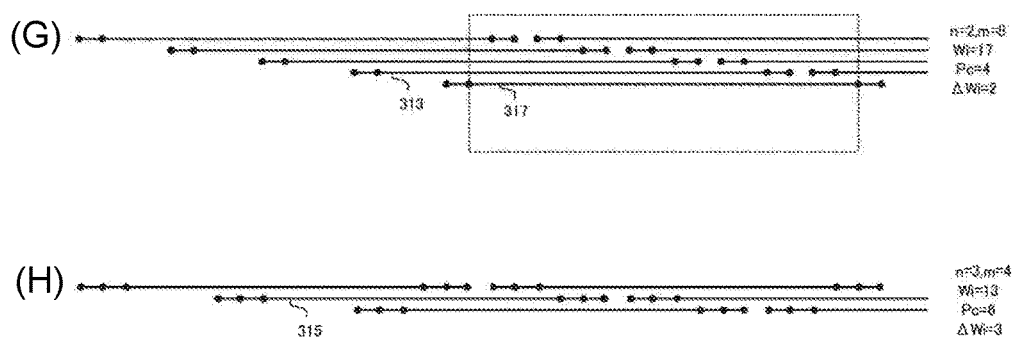

The number q of the sensor coil #q to start the shortening is found as m/2. Sensor coils on the outer side of the sensor coil #q with a shortened coil width is smaller than the coil pitch of the sensor coils on the inside whose coil width is not shortened by ΔWi/2. FIG. 12(A) to (C) illustrates the case of the number of turns n of 1. In this case, the coil width Wi of the sensor coils arranged on the outside of the sensor coils 301 to 305 that is obtained by calculation of m/2 to start the shortening is calculated by Expression (2), and the coil pitch is shortened by 1 pitch from the coil width Wi of the previous sensor coil.

FIG. 12(D) to (G) illustrates the case of the number of turns n of 2. In this case, the coil pitch of the sensor coils arranged on the outside of the sensor coils 307 to 313 to start the shortening is shortened by 2 pitches from the coil width Wi of the previous sensor coil. FIG. 12(H) illustrates the case of the number of turns n of 3. In this case, the coil pitch of the sensor coils arranged on the outside of the sensor coil 315 to start the shortening is shortened by 3 pitches from the coil width Wi of the previous sensor coil.

While the disclosed embodiments has been described by way of a particular embodiment illustrated in the drawings, the disclosed embodiments is not limited to the embodiments illustrated in the drawings, and naturally any conventionally known configuration may be used as long as the effects of the disclosed embodiments are achieved.

What is claimed is:

1. A sensor panel capable of being mounted at a coordinate detection device configured to output coordinates of a position indicator based on electromagnetic induction, the sensor panel including a coil array having a plurality of loop-like sensor coils, comprising:
   a first sensor coil group including a plurality of sensor coils having a same coil width, the first sensor coil group being disposed at a central part of the coil antsy to have a predetermined coil side pitch; and a second sensor coil group including a plurality of sensor coils having a coil width narrower than the coil width of the first sensor coil group, the second sensor coil group being disposed at a peripheral part of the coil array;
   wherein a predetermined group of sensor coils of the second sensor coil group arranged from the central part to the peripheral part of the coil array comprise coil widths that are gradually shortened.

2. The sensor panel of claim 1, wherein the second sensor coil group defines a coil side pitch equal to the predetermined coil side pitch.

3. The sensor panel of claim 1, wherein, in a sensor coil making up the first sensor coil group, an outside coil side and an inside coil side of another sensor coil are alternately disposed, and in a sensor coil on an outermost side making up the second sensor coil group, an outside coil side of another sensor coil is disposed.

4. The sensor panel of claim 3, wherein let that the sensor coils have the number of turns n and the predetermined coil side pitch is 1, the sensor coils making up the second sensor group have coil widths that are shortened from an inside to an outside of the coil array so that a coil width of a sensor coil is shorter than a coil width of an inwardly adjacent sensor coil by n pitch.

5. The sensor panel of claim 4, wherein when the number of sets of coil sides of another sensor coil to be inserted in a sensor coil making up the first sensor coil group is m, a coil width is shortened from a sensor coil located at the m/2th from the outside of the coil array.

6. The sensor panel claim 4, wherein the sensor coils making up the second sensor coil group has a coil pitch smaller than a coil pitch of the sensor coils making up the first sensor coil group by n/2 pitch.

7. The sensor panel of claim 1, wherein let that the number of turns n of each sensor coil is 2 or more, a set of coil sides of each sensor coil has a coil side pitch equal to the predetermined coil side pitch.

8. An apparatus, comprising:
   a sensor panel including a first sensor coil group arranged with a same coil pitch at a central part of a coil array, and a second sensor coil group arranged with a narrower coil pitch at a peripheral part of the coil array, wherein a predetermined group of sensor coils of the second sensor coil group arranged from the central part to the peripheral part of the coil array comprise coil widths that are gradually shortened; and
   a controller configured to output coordinates data based on magnetic flux generated by a position indicator and inductive voltage induced by each sensor coil linking with magnetic flux generated by a position indicator, wherein
   the controller extracts top three sensor coils in the descending order of signal intensity from the first sensor coil group for three-point supplementing, and extracts two sensor coils including a sensor coil located on an outermost side of the second sensor coil group and an inwardly adjacent sensor coil for two-point supplementing, thus creating coordinates data.

9. The apparatus of claim 8, wherein the second sensor coil group defines a coil side pitch equal to a predetermined coil side pitch.

10. The apparatus of claim 8, wherein, in a sensor coil making up the first sensor coil group, an outside coil side and an inside coil side of another sensor coil are alternately disposed, and in a sensor coil on an outermost side making up the second sensor coil group, an outside coil side of another sensor coil is disposed.

11. The apparatus of claim 10, wherein let that the sensor coils have comprise then number of turns n and, the predetermined coil side pitch is 1, and the sensor coils making up the second sensor group have coil widths that are shortened from an inside to an outside of the coil array so that a coil width of a sensor coil is shorter than a coil width of an inwardly adjacent sensor coil by n pitch.

12. The apparatus of claim 11, wherein when the number of sets of coil sides of another sensor coil to be inserted in a sensor coil making up the first sensor coil group is m, a coil width is shortened from a sensor coil located at the m/2th from the outside of the coil array.

13. The apparatus of claim 12, wherein the sensor coils making up the second sensor coil group has a coil pitch smaller than a coil pitch of the sensor coils making up the first sensor coil group by n/2 pitch.

14. The apparatus of claim 8, wherein let that the number of turns n of each sensor coil is 2 or more, a set of coil sides of each sensor coil has a coil side pitch equal to a predetermined coil side pitch.

15. A method for reducing an indication error at a peripheral part of an electromagnetic induction type coordinate detection device, comprising:
providing a first sensor coil group including a plurality of sensor coils having a same coil width, the first sensor coil group being disposed at a central part of the coil array to have a predetermined coil side pitch; and
providing a second sensor coil group including a plurality of sensor coils having a coil width narrower than the coil width of the first sensor coil group, the second sensor coil group being disposed at a peripheral part of the coil array, wherein the coil widths of a predetermined group of sensor coils of the second sensor coil group arranged from the central part to the peripheral part of the coil array are gradually shortened;
arranging a plurality of sensor coils at a predetermined coil pitch on a coordinate axis;
shortening a coil width of a sensor coil positioned close to the peripheral part to be arranged on an outside of the selected sensor coil compared with a coil width of an inwardly adjacent sensor coil, thus making a coil pitch narrower than the predetermined coil pitch; and
detecting coordinates of a position indicator by a two-point supplementing method based on a signal that a sensor coil arranged on an outermost side of the sensor coils with shortened coil width detects and a signal that a sensor coil arranged inwardly adjacent to the sensor coil detects.

16. The method of claim 15, wherein the second sensor coil group defines a coil side pitch equal to the predetermined coil side pitch.

17. The method of claim 15, wherein, in a sensor coil making up the first sensor coil group, an outside coil side and an inside coil side of another sensor coil are alternately disposed, and in a sensor coil on an outermost side making up the second sensor coil group, an outside coil side of another sensor coil is disposed.

* * * * *